# 2,827,489

PROCESS FOR THE PREPARATION OF 2-DIPHENYLACETYL-1,3-INDANDIONE

Robert D. Birkenmeyer and Merrill E. Speeter, Kalamazoo Township, Kalamazoo County, Mich., assignors to The Upjohn Company, Kalamazoo, Mich., a corporation of Michigan No Drawing. Application January 27, 1956
Serial No. 561,951

4 Claims. (Cl. 260—590)

The present invention relates to a novel process for the preparation of 2-diphenylacetyl-1,3-indandione.

The compound produced by the present process has anticoagulant and rodenticidal activity and can be represented by the following formula:

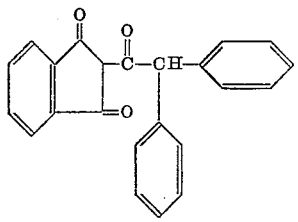

The process of the present invention involves heating diphenylacetone with at least a fifty percent molal excess of a di(lower-alkyl) phthalate in the presence of benzene and an alkali-metal alkoxide to a temperature between 95 and about 150 degrees centigrade whilst distilling benzene and the alkanol produced during the reaction from the reaction zone, and recovering 2-diphenylacetyl-1,3-indandione from the reaction mixture.

In U. S. Patent 2,672,483 is disclosed a process for the preparation of 2-diphenylacetyl-1,3-indandione. In the patent process equimolar quantities of diphenylacetone and dimethyl phthalate are employed and the reaction is carried out at the reflux temperature of the reaction solvent, i. e., benzene, or more specifically about eighty degrees centigrade.

It has been quite unexpectedly discovered in accordance with the present invention that by utilizing a molal excess of di(lower-alkyl) phthalate and a higher temperature range, viz., between 95 degrees and about 150 degrees centigrade, while distilling benzene and the alkanol produced in the reaction from the reaction zone that far superior yields of product are obtained. Molal excess of di(lower-alkyl) phthalate can be achieved by utilizing at least 1.5 moles of di(lower-alkyl) phthalate for each mole of diphenylacetone. It has also been discovered that by employing an excess of a di(lower-alkyl) phthalate, the reaction mixture tends to become much more workable and less prone to charring.

Di(lower-alkyl) phthalates which can be used in the present invention include, for example, dimethyl phthalate, diethyl phthalate, dipropyl phthalate, dibutyl phthalate, and the like.

According to the process of the present invention, the condensation of diphenylacetone with a di(lower-alkyl) phthalate is carried out in the presence of benzene, an alkali-metal alkoxide, for example, sodium methoxide, potassium ethoxide, and the like. The condensation is generally conducted at a temperature between 95 degrees and about 150 degrees centigrade, preferably about 100 degrees centigrade. During the reaction the benzene and alkanol produced as a reaction product are removed from the reaction zone, either intermittently or continuously, preferably by distillation. The reaction is generally carried on until there is no further distillate and a red, viscous residue remains. This generally occurs between about three hours and about six hours, the longer reaction time being required at the lower temperatures. The product, 2-diphenylacetyl-1,3-indandione, can be isolated according to any convenient procedure, e. g., the resulting mixture can be cooled, and ethanol added to the mixture to dissolve the tarry material present, leaving in suspension an alkali-metal salt of 2-diphenylacetyl-1,3-indandione. Upon acidification of the alkali-metal salt, for example, with dilute hydrochloric acid, 2-diphenylacetyl-1,3-indandione separates as a light yellow solid. The product can be recrystallized from a suitable solvent, e. g., ethanol or acetone, to a greater degree of purity.

The following examples are illustrative of the process and products of the present invention, but are not to be construed as limiting.

*Example 1.—2-diphenylacetyl-1,3-indandione*

6.9 grams (0.3 mole) of sodium was dissolved in seventy milliliters of anhydrous methanol and 250 milliliters or benzene was added with vigorous stirring. The stirring was continued while the benzene and excess methanol were distilled. The resulting sodium methoxide suspension was diluted with 250 milliliters of benzene and 46 grams (0.24 mole) of dimethyl phthalate. The mixture was stirred and heated with an oil bath to vigorous reflux. A solution of 21 grams (0.1 mole) of diphenylacetone in 100 milliliters of benzene was added dropwise over a 1.5 hour period. During this addition 100 milliliters of distillate was removed by use of a water take-off trap. A solution of 21 grams (0.1 mole) of diphenylacetone and 30 grams (0.13 mole) of dimethyl phthalate in 100 milliliters of benzene was added dropwise over a second 1.5 hour period. Another 100 milliliters of distillate was removed. The reaction temperature was raised to 140 degrees centigrade and maintained at this level for one hour. The oil bath was removed and the reaction temperature was allowed to drop to 90 degrees centigrade before 150 milliliters of ethanol was added. Stirring and refluxing was resumed until all of the dark viscous material was in solution. The solution was poured into a 500-milliliter beaker and heated on the steam bath until the total volume was about 100 milliliters. This solution was cooled and stirred in an ice bath at about 25 degrees centigrade while adding fifty milliliters of concentrated hydrochloric acid in about ½ minute. The product separated as a light yellow solid and was collected on a filter. The product was agitated and washed for about one minute with 500 milliliters of water to remove sodium chloride. The resulting suspension was filtered and recrystallized from ethanol to produce 42 grams (62 percent yield based on diphenylacetone) of 2-diphenylacetyl-1,3-indandione which melted between 146 and 147 degrees centigrade.

*Example 2.—2-diphenylacetyl-1,3-indandione*

In the same manner as shown in Example 1, 2-diphenylacetyl-1,3-indandione was prepared in a 67 percent yield by heating the reaction mixture to 100 degrees centigrade.

*Example 3.—2-diphenylacetyl-1,3-indandione*

1.8 liters of a solution of sodium methoxide in methanol (25 percent sodium methoxide by weight) and six liters of benzene was added to a twelve-liter, 3-neck flask and the mixture was distilled to dryness. 2.5 liters of benzene and four moles of dimethyl phthalate was added to the reaction flask. The mixture was brought to reflux and two moles of diphenylacetone dissolved in two liters of benzene was added through a dropping funnel into the flask in about 0.5 to 0.75 hours while simultaneously removing 2.5 liters of distillate. The remaining benzene was distilled and the reaction temperature was raised to 140 degrees centigrade. The reaction was continued until no further distillate was recovered and a red, viscous residue remained. The product, 2-diphenylacetyl-1,3-indandione, was recovered in 65 percent yield (420 grams) in the same manner as disclosed in Example 1 except that acetone was utilized as the final purifying solvent in lieu of ethanol.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process for the preparation of 2-diphenylacetyl-1,3-indandione which comprises the steps of heating a mixture of diphenylacetone and at least a fifty percent molal excess of a di(lower-alkyl) phthalate in the presence of an alkali-metal alkoxide and benzene to a temperature between 95 degrees and about 150 degrees centigrade whilst distilling benzene and the alkanol produced during the reaction from the reaction zone, and recovering 2-diphenylacetyl-1,3-indandione from the reaction mixture.

2. A process for the preparation of 2-diphenylacetyl-1,3-indandione which comprises the steps of heating a mixture of diphenylacetone and at least a fifty percent molal excess of a di(lower-alkyl) phthalate in the presence of sodium methoxide and benzene to a temperature between 95 and about 150 degrees centigrade whilst distilling benzene and the alkanol produced during the reaction from the reaction zone, and recovering 2-diphenylacetyl-1,3-indandione from the reaction mixture.

3. A process for the preparation of 2-diphenylacetyl-1,3-indandione which comprises the steps of heating a mixture of diphenylacetone and at least a fifty percent molal excess of dimethyl phthalate in the presence of sodium methoxide and benzene to a temperature between 95 and about 150 degrees centigrade whilst distilling benzene and methanol produced during the reaction from the reaction zone, and recovering 2-diphenylacetyl-1,3-indandione from the reaction mixture.

4. A process for the preparation of 2-diphenylacetyl-1,3-indandione which comprises the steps of heating a mixture of diphenylacetone and at least a fifty percent molal excess of dimethyl phthalate in the presence of sodium methoxide and benzene to about 100 degrees centigrade whilst distilling benzene and methanol produced during the reaction from the reaction zone, and recovering 2-diphenylacetyl-1,3-indandione from the reaction mixture.

References Cited in the file of this patent

UNITED STATES PATENTS 2,672,483    Thomas _____ Mar. 16, 1954